March 23, 1937.    W. J. SYMONS    2,074,871
PROPELLER
Filed March 18, 1932    2 Sheets-Sheet 2

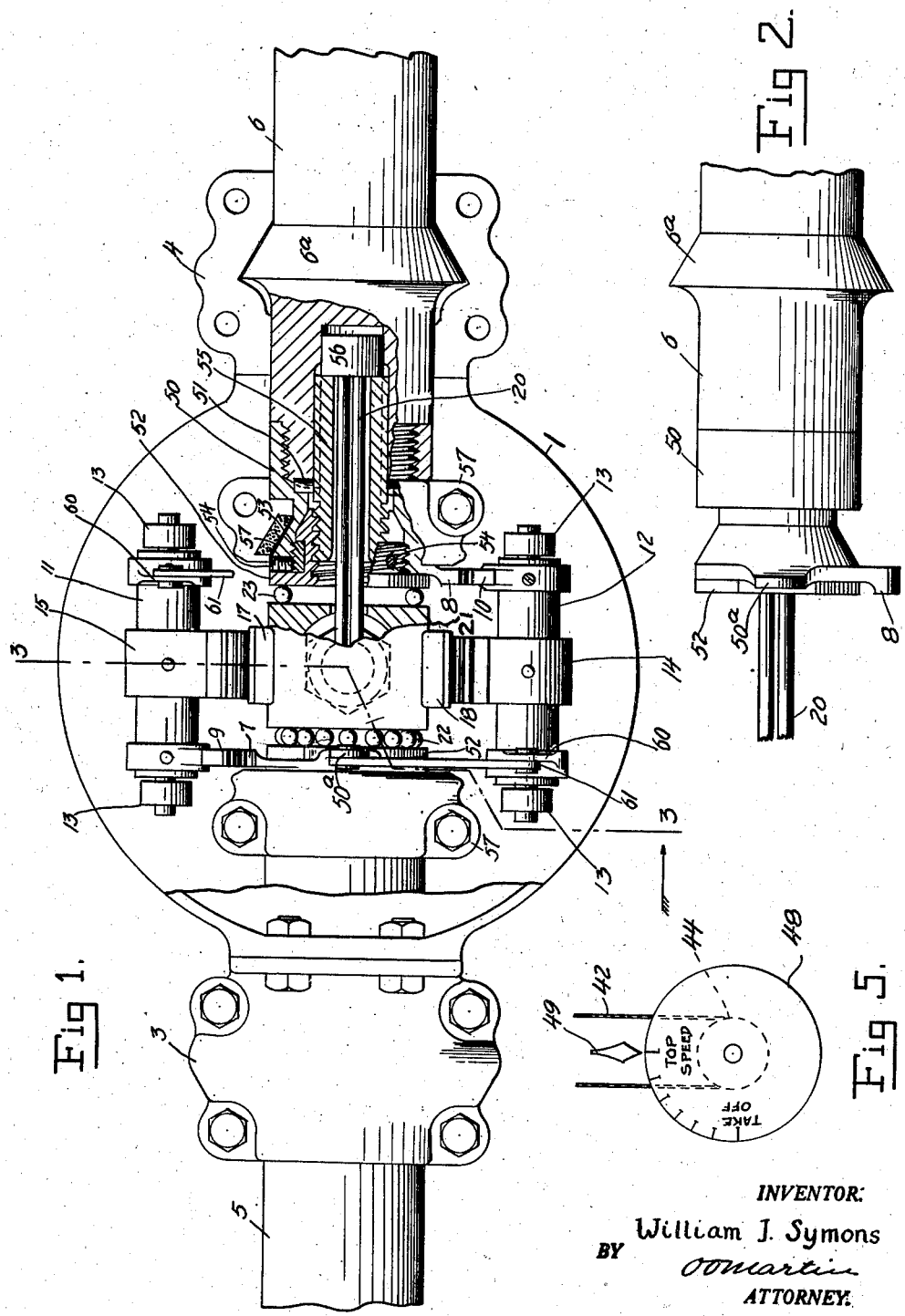

INVENTOR:
William J. Symons.
BY
ATTORNEY.

Patented Mar. 23, 1937

2,074,871

UNITED STATES PATENT OFFICE 2,074,871

PROPELLER

William J. Symons, Santa Monica, Calif., assignor to Helen W. Symons, West Los Angeles, Calif.

Application March 18, 1932, Serial No. 599,716

9 Claims. (Cl. 170—163)

This invention relates to airplanes and has particular reference to improvements in means for varying the pitch angle of propeller blades relative to the speed of the airplane and its engine.

Fixed pitch propellers are usually designed to reach maximum efficiency when the plane and its engine attain normal top speed. Below this point the propeller efficiency rapidly decreases until, at the take-off where efficiency is highly desirable, the condition becomes so unsatisfactory that the plane, on a short field or under a heavy load, may be unable to rise.

With these conditions in view, the principal object of the invention is to provide a propeller mechanism which, before approaching and attaining normal top speed, conveniently may be manipulated by the pilot of the plane to adjust the propeller blade pitch angle to suit the speed of the plane and its engine, but which becomes firmly clamped in adjusted position when such normal top speed is attained. A further object is the provision of improved means for effecting the adjustment of the propeller blades.

Figure 3:
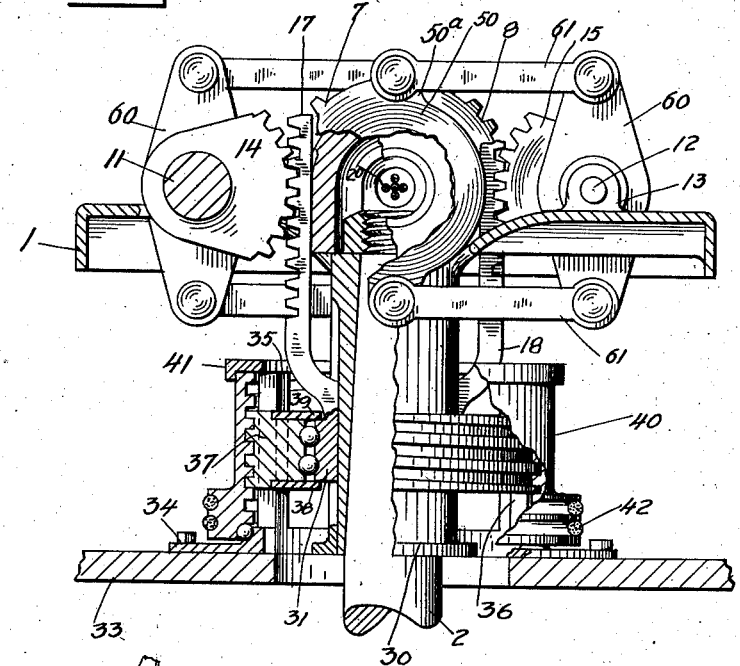
Figure 4:
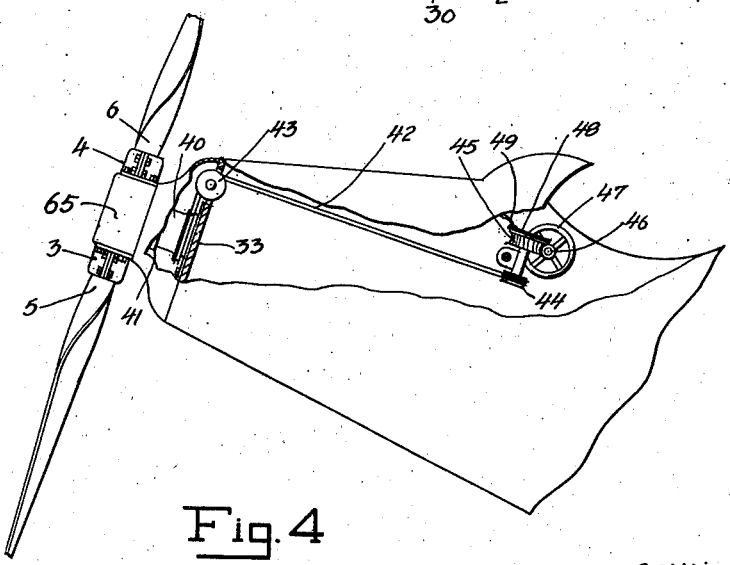

A structure illustrative of my invention is exhibited in the accompanying drawings, of which:

Fig. 1 is a front elevation of the blade supporting hub of an airplane engine shaft. Parts are, starting from the left, more and more broken away in order to disclose the interior mechanism, Fig. 2 shows one of the assembled propeller blade hubs removed from Fig. 1, Fig. 3 is a sectional end view of the device taken substantially on line 3—3 of Fig. 1, Fig. 4 illustrates the adaptation of the device to an airplane fuselage, and Fig. 5 illustrates my pitch angle indicator.

The numeral 1 denotes a circular table suitably fastened to be rotated by the engine crankshaft 2. The end of this shaft is indicated in dotted outline at the center of Fig. 1. The table is flanged on opposite sides to support bearings 3 and 4 for the hubs 5 and 6 of two propeller blades.

From the inner ends of these hubs project gear segments 7 and 8, and these segments are in mesh with gear segments 9, 10 of two pivots 11 and 12. The pivots are suitably supported on the table, as by bearing posts 13. Centrally and rigidly affixed to the pivots are two gear segments 14, 15, in mesh with racks 17, 18, and the latter are fitted to slide parallel with the axis of the crankshaft on opposite sides thereof. These racks, as will presently be explained, are combined to move together axially, thereby to rock the pivots and, through the segments 7 to 10 to rotate the propeller blades axially.

It is well to state at this point that the propeller mounting is symmetrical, must be symmetrical in order for the propeller to function properly; all the mechanism on one side of the centerline must therefore be exactly like that on the opposite side. Where parts are broken away in order to disclose enclosed parts, it is understood that exactly similar parts are found on the opposite side even if covered.

In the center of the table is set a block 21, and suitable thrust bearings 22, 23 are placed between this block and the inner ends of the propeller hubs. The propeller hub 6 is shown made with a conical shoulder 6ª, which is positioned to bear against a corresponding shoulder of the support bearing 4. Normally however, the shoulders of the propeller hubs do not quite touch these bearings, the reason being that the two hubs are tied together by means of a suitable cable 20. This cable, which may be composed of a plurality of wires or of small cables, is tied to the propeller blade hubs, as will hereinafter be fully described, in such relation that the distance between the hub shoulders is slightly less than the bearing shoulder distance.

The tension of the cable 20 is adjusted to hold the propeller hubs pressed against the block 21 with great force, and the thrust bearings 22, 23 are introduced to reduce the friction at this point, which otherwise might interfere with the operation of adjusting the pitch angle.

From this brief description it should be clear to those versed in the art, how the lengthwise movement of the racks 17, 18 is translated into an axial rotation of the propeller blades. Let now the engine be started and the propeller commence to turn. Instantly centrifugal force commences to operate to urge the propeller blades apart, and this force is opposed by the cable 20. The tensile strength and the tension of the cable have been so calculated that it will resist this force until engine top speed is approached and then to yield until the conical hub shoulders seat on the adjacent bearing shoulders.

While the maximum speed is maintained, these shoulders remain so firmly engaged that the propeller may be considered a fixed pitch propeller, and it would perhaps not be possible to change the blade angle until a slower speed again would permit a separation of these shoulders. This axial movement of the propeller blades should, of course, be very slight, and well within the elastic limit of the cable.

Referring now to Fig. 3, it is seen that the table 1 projects from a hub 30 of the engine shaft 2. In this hub are cut opposed keyways, within which the inner ends of the racks 17, 18 are fitted to slide. The racks are fastened to or integral with an annular sleeve 31. The numeral 33 denotes the front end of the fuselage or engine hood, and to this is fastened a flange 34, from which rises a plurality of guideposts 35, 36. An externally threaded nut 37 is slotted to slide axially on these guideposts and it is made with flanges 38, 39 straddling the rack sleeve 31. An internally threaded control ring 40 is mounted to rotate on the flange 34, but it is suitably held against axial displacement, as by an annular cap 41. This cap may by means of screws, not shown, be firmly secured on the ends of the guide posts 35 and 36. Because the front portion of the structure of Fig. 3 is broken away, only two of these posts appear in the drawing, but in actual practice, at least three are required. The screw threads of this ring and of the nut 37 intermesh, the result being that a rotation of the ring causes the nut 37 to slide axially on the guideposts 35, 36. The racks 17, 18, being part of the nut, are correspondingly moved, to change the pitch angle of the propeller blades, as above described. Anti-friction bearings should be employed at all points where friction would develop, and are indicated at various points in the drawings.

The control ring 40 is shown made with annular grooves for a control cable 42 which, as indicated in Fig. 4, passes over an idler 43 to a sheave 44. This sheave is mounted to rotate with a wormwheel 45, and the latter is rotatable by a worm 46 on the shaft of a hand wheel 47. The latter is conveniently mounted in the cockpit of the fuselage so as to be within easy reach of the pilot. It is desirable to mount a dial 48 in a convenient position, such as indicated in Fig. 5, where the dial is fastened on the wormwheel shaft for registration with a fixed pointer 49 of the fuselage. This dial should be suitably graduated for the guidance of the pilot. As the adjustment of the pitch angle is mostly needed between the slow take-off speed and the normal top speed, these two points may conveniently be indicated on the dial and intermediate graduations added to suit the particular service of the plane employing my invention.

Returning now to Fig. 1, it is to be noted that the propeller blade hub is made with an inward extension 50, which is screwed tightly into position, whereupon a pin, or key 51 is pushed into alined notches of the two parts, from within a cylindrical bore of the hub, to lock the parts together. This bore increases in size from the key 51 to the inner end of the hub. It is there threaded to receive a cable adjusting flange 52 and to hold the latter against axial displacement. The flange 52 is made with an annular groove, in which a split nut 53 is fitted, whereupon the nut and flange are screwed into the hub. One or more set screws 54 are then employed to lock the split nut against rotation.

The bore of the blade hub is made with diametrally opposed keyway, in which a sleeve 55 is longitudinally slidable. This sleeve is made with external threads engaging interral threads of the flange 52 for the purpose of advancing the sleeve against an anchor block 56, in which the cable 20 terminates. In order to insure positive movement it is well to apply ratchet-tooth shape to these threads, substantially as indicated.

Remembering now that both sides of the device are alike, it is seen that two sleeves 55 are mounted to advance, by means of two flanges 52, against two anchors 56, to put the cable under proper tension. To facilitate this adjustment it is well to shape the outer, projecting end of the flange 52 to receive a suitable wrench, as best indicated in Fig. 2. The inner ends of the blade hubs are preferably provided with a second set of conical bearings, as indicated at 57, in order better to balance the blade.

Because the segments 9 and 10 are mounted on one end of the pivots, there is danger of twisting the pivots, when the rackbars are moved to change the propeller blade angle. It is now noticed, that a lever 60 is shown mounted on the opposite, free end of the pivots and connected, by means of links 61, with lips 50ª of the inner blade hub portions 50. In this manner a parallel link movement is applied to operate in conjunction with the segments 7, 8, 9 and 10 for the purpose of balancing the pitch adjusting mechanism, to smoothen the action of this mechanism, and also to eliminate lost motion and better to resist the propeller torque.

For the sake of clearness, the mechanism hereinbefore described is shown exposed on the end of the propeller shaft. It is well, however, to provide suitable covering, and such is indicated at 65, in Fig. 4.

It should now be clear to those versed in the art, that the principal object of my invention is the provision of a propeller controlling mechanism capable of varying the angle of attack during flight, until a certain speed is attained, whereupon the propeller blades become so firmly clamped in position that no further angular adjustment can be made, that no axial movement, tending to separate the blades, is possible, and that the blades remain rigidly locked against vibration or flutter.

As stated, the structure of the drawings is merely illustrative of my invention, and I reserve right to modify the structure, so long as I remain within the scope of the following claims.

I claim:

1. In a propeller, means for varying the propeller pitch angle during flight, uninterrupted means for interconnecting the propeller blades to resist the centrifugal force tending to separate the blades, means externally accessible for adjusting the tension of said interconnecting means to resist such force until a predetermined pressure is attained, and means for clamping the blades in adjusted position axially and radially upon yielding to such predetermined pressure.

2. In a propeller, a support on the propeller shaft, a pair of propeller blades journaled on said support, a central member rigid on said support and separating the inner ends of said blades, means connecting said ends to resist centrifugal pressure against the blades during propeller revolution, means for adjusting the tension of said interconnecting means, anti-friction bearings between the propeller ends and said central member, and means for varying the propeller pitch angle during propeller rotation.

3. In a propeller, a support on the propeller shaft, a pair of propeller blades journaled on said support, a central member separating the inner ends of said blades, means yieldably interconnecting said ends to resist centrifugal pressure during propeller revolution, means for adjusting the tension of said interconnecting means to yield at a predetermined pressure, antifriction bearings between the propeller blade ends and the said central member, means for varying the pitch angle of the propeller during revolution, and means for clamping the blades to the support as the interconnecting means yields to such pressure.

4. In a propeller, a support on the propeller shaft, a pair of propeller blades having inner hubs journaled on said support, gear segments on said hubs, means engaging said segments to interconnect the blades for simultaneous rotation, toothed racks geared to rotate said means to vary the pitch angle, a member rotatable on the propeller shaft and operatively connected to move said racks parallel with said shaft, and means for rotating said member to move the racks and therethrough to change the propeller pitch angle.

5. In a propeller, a support on the propeller shaft, a pair of propeller blades having inner hubs journaled on said support, gear segments on said hubs, means engaging said segments to interconnect the blades for simultaneous rotation, a pair of interconnected racks geared to rotate said means to vary the pitch angle, a member rotatable on the propeller shaft and operatively connected to move said racks parallel with said shaft, manual means for rotating said member, and means for clamping the propeller blades to said support axially and radially when a predetermined propeller speed is attained.

6. In a propeller, a support on the propeller shaft, propeller blades having inner hubs journaled on said support, pivots rotatably mounted on the support on opposite sides of said hubs, gear segments mounted on said pivots, racks movable axially along the propeller shaft and meshing with said gear segments on said pivots, connections between the pivots and the said hubs, and means for moving said racks axially to rotate said pivots and through said connections the said hubs for the purpose of varying the propeller pitch angle.

7. In a propeller, a support on the propeller shaft, propeller blades having inner hubs journaled on said support, pivots on the support on opposite sides of said hubs, central gear segments mounted on said pivots, racks movable axially along the propeller shaft and meshing with said central segments on said pivots, members on each end of the pivots and connected to rotate said hubs, a member rotatable on the propeller shaft and connected to move said racks axially in response to such rotation, and manually operable means for rotating said member.

8. In a propeller, a support on the propeller shaft, propeller blades having inner hubs journaled on said support, pivots on the support on opposite sides of the hubs, gear segments on one end of said pivots in mesh with gear teeth in a flange of said hubs, levers on the opposite end of the pivots, parallel links connecting both ends of said levers with the said hub flanges, and means for rocking said pivots to rotate the propeller blade hubs, the segments and levers on opposite ends of the pivots serving to balance each other so as to prevent twisting of the pivots and to prevent lost motion in the connections.

9. In a propeller, a support on the propeller shaft, blades on said support, a central member rigid on the support and separating the inner ends of said blades, means interconnecting said blade ends to resist centrifugal pressure, antifriction bearings between the blade ends and the said central member, means for adjusting the tension of said interconnecting means, means for locking the adjusted parts against accidental readjustment, and manually operable means for varying the propeller pitch angle.

WILLIAM J. SYMONS.